(12) United States Patent
Berkman et al.

(10) Patent No.: US 7,852,207 B2
(45) Date of Patent: Dec. 14, 2010

(54) METHOD FOR ESTABLISHING POWER LINE COMMUNICATION LINK

(75) Inventors: William H. Berkman, New York, NY (US); Alice Shirley Filemyr, Rockville, MD (US); Robert Douglas Kehn, Myersville, MD (US)

(73) Assignee: Current Technologies, LLC, Germantown, MD (US)

( * ) Notice: Subject to any disclaimer, the term of this patent is extended or adjusted under 35 U.S.C. 154(b) by 790 days.

(21) Appl. No.: 11/353,098

(22) Filed: Feb. 14, 2006

(65) Prior Publication Data

US 2007/0189182 A1    Aug. 16, 2007

(51) Int. Cl.
  *G08B 1/08* (2006.01)
(52) U.S. Cl. .................. 340/538.16; 370/248; 370/355
(58) Field of Classification Search ................. 370/241, 370/252, 431, 463; 340/310.11, 310.16, 340/310.17, 500, 531, 539.1; 455/130, 269, 455/270; 375/257, 258
See application file for complete search history.

(56) References Cited

U.S. PATENT DOCUMENTS

| | | | |
|---|---|---|---|
| 3,369,078 A | 2/1968 | Stradley |
| 3,810,096 A | 5/1974 | Kabat et al. |
| 3,911,415 A | 10/1975 | Whyte |
| 3,942,168 A | 3/1976 | Whyte |
| 3,942,170 A | 3/1976 | Whyte |
| 3,944,723 A | 3/1976 | Fong |
| 3,964,048 A | 6/1976 | Lusk et al. |
| 3,967,264 A | 6/1976 | Whyte et al. |
| 3,973,087 A | 8/1976 | Fong |
| 3,973,240 A | 8/1976 | Fong |
| 4,004,110 A | 1/1977 | Whyte |
| 4,057,793 A | 11/1977 | Johnson et al. |
| 4,060,735 A | 11/1977 | Pascucci et al. |
| 4,239,940 A | 12/1980 | Dorfman |
| 4,250,489 A | 2/1981 | Dudash et al. |
| 4,475,209 A | 10/1984 | Udren |

(Continued)

FOREIGN PATENT DOCUMENTS

EP    1 251 646 A2    10/2002

(Continued)

OTHER PUBLICATIONS

"EMETCON Automated Distribution System: Communications Guide", *Westinghouse ABB Power T & D Company Technical Manual 42-6001A.*, (Sep. 1989),1-55.

(Continued)

*Primary Examiner*—Seema S Rao
*Assistant Examiner*—Khoa Huynh
(74) *Attorney, Agent, or Firm*—Mel Barnes; Capital Legal Group, LLC

(57) ABSTRACT

A method for providing power line communications in a multi-unit building is provided. One embodiment includes determining the quality of a communication link associated with each of a plurality of communication nodes, selecting one of the plurality of communication nodes based, at least in part, on the quality of the communication links associated with the communication nodes; and establishing communications with an external network through the selected one communication node. In addition, in some embodiments at least one of the communication links associated with the plurality of communication nodes includes a non-conductive radio frequency coupled segment.

15 Claims, 8 Drawing Sheets

U.S. PATENT DOCUMENTS

| | | | |
|---|---|---|---|
| 4,599,598 | A | 7/1986 | Komoda et al. |
| 4,638,298 | A | 1/1987 | Spiro |
| 4,642,607 | A | 2/1987 | Strom et al. |
| 5,066,939 | A | 11/1991 | Mansfield, Jr. |
| 5,257,006 | A | 10/1993 | Graham et al. |
| 5,319,634 | A | 6/1994 | Bartholomew et al. |
| 5,726,980 | A | 3/1998 | Rickard |
| 5,818,821 | A | 10/1998 | Schurig |
| 5,870,016 | A | 2/1999 | Shresthe |
| 5,929,748 | A | 7/1999 | Odinak |
| 5,949,327 | A | 9/1999 | Brown |
| 5,966,375 | A * | 10/1999 | Kagaya ............ 370/338 |
| 5,978,371 | A | 11/1999 | Mason, Jr. et al. |
| 6,151,480 | A | 11/2000 | Fischer et al. |
| 6,160,795 | A | 12/2000 | Hosemann |
| 6,346,875 | B1 | 2/2002 | Puckette et al. |
| 6,373,377 | B1 | 4/2002 | Sacca et al. |
| 6,417,762 | B1 | 7/2002 | Comer |
| 6,526,581 | B1 | 2/2003 | Edson |
| 6,587,739 | B1 | 7/2003 | Abrams et al. |
| 6,624,532 | B1 | 9/2003 | Davidow et al. |
| 6,687,574 | B2 | 2/2004 | Pietrowicz et al. |
| 6,771,775 | B1 | 8/2004 | Widmer |
| 6,778,817 | B1 | 8/2004 | Bullock et al. |
| 6,842,459 | B1 | 1/2005 | Binder |
| 6,885,674 | B2 | 4/2005 | Hunt et al. |
| 6,952,159 | B1 | 10/2005 | Muller |
| 6,956,464 | B2 | 10/2005 | Wang et al. |
| 6,961,303 | B1 | 11/2005 | Binder |
| 6,965,303 | B2 | 11/2005 | Mollenkopf |
| 6,975,212 | B2 | 12/2005 | Crenshaw et al. |
| 6,977,578 | B2 | 12/2005 | Kline |
| 6,980,091 | B2 | 12/2005 | White et al. |
| 6,993,317 | B2 | 1/2006 | Belsak, Jr. |
| 6,998,962 | B2 | 2/2006 | Cope et al. |
| 7,269,403 | B1 | 9/2007 | Miao |
| 2002/0011923 | A1 | 1/2002 | Cunningham et al. |
| 2002/0109585 | A1 | 8/2002 | Sanderson |
| 2002/0154000 | A1 * | 10/2002 | Kline ................ 340/310.01 |
| 2002/0186699 | A1 | 12/2002 | Kwok |
| 2003/0050737 | A1 | 3/2003 | Osann, Jr. |
| 2003/0052770 | A1 | 3/2003 | Mansfield, Jr. et al. |
| 2003/0062990 | A1 | 4/2003 | Schaeffer, Jr. et al. |
| 2003/0071719 | A1 | 4/2003 | Crenshaw et al. |
| 2003/0100288 | A1 | 5/2003 | Tomlinson, Jr. et al. |
| 2003/0101459 | A1 | 5/2003 | Edson |
| 2003/0103307 | A1 | 6/2003 | Dostert |
| 2003/0106067 | A1 | 6/2003 | Hoskins et al. |
| 2003/0224784 | A1 | 12/2003 | Hunt et al. |
| 2003/0226149 | A1 | 12/2003 | Chun et al. |
| 2004/0037317 | A1 | 2/2004 | Zalitzky et al. |
| 2004/0066283 | A1 | 4/2004 | Manis et al. |
| 2004/0067745 | A1 | 4/2004 | Belsak |
| 2004/0090312 | A1 | 5/2004 | Manis et al. |
| 2004/0110483 | A1 | 6/2004 | Mollenkopf |
| 2004/0135676 | A1 | 7/2004 | Berkman et al. |
| 2004/0157551 | A1 | 8/2004 | Gainey et al. |
| 2004/0163128 | A1 | 8/2004 | Phillips et al. |
| 2004/0168199 | A1 | 8/2004 | Phillips et al. |
| 2004/0178888 | A1 | 9/2004 | Hales et al. |
| 2004/0196144 | A1 | 10/2004 | Crenshaw et al. |
| 2004/0227623 | A1 | 11/2004 | Pozsgay |
| 2004/0233928 | A1 | 11/2004 | Pozsgay |
| 2004/0242185 | A1 | 12/2004 | Lee |
| 2005/0040809 | A1 | 2/2005 | Uber, III et al. |
| 2005/0046550 | A1 | 3/2005 | Crenshaw et al. |
| 2005/0068223 | A1 | 3/2005 | Vavik |
| 2005/0128057 | A1 | 6/2005 | Mansfield et al. |
| 2005/0164666 | A1 | 7/2005 | Lang et al. |
| 2005/0168326 | A1 * | 8/2005 | White et al. ........... 340/310.01 |
| 2005/0200459 | A1 | 9/2005 | White, II |
| 2005/0220004 | A1 | 10/2005 | Vollmer et al. |
| 2005/0249245 | A1 | 11/2005 | Hazani et al. |
| 2005/0285720 | A1 | 12/2005 | Cope et al. |
| 2006/0017324 | A1 | 1/2006 | Pace et al. |
| 2006/0034330 | A1 | 2/2006 | Iwamura |
| 2006/0038660 | A1 | 2/2006 | Doumuki et al. |
| 2006/0044076 | A1 | 3/2006 | Law |
| 2006/0045105 | A1 | 3/2006 | Dobosz et al. |
| 2006/0049693 | A1 | 3/2006 | Abraham et al. |
| 2006/0050642 | A1 | 3/2006 | Chini et al. |
| 2006/0072695 | A1 | 4/2006 | Iwamura |
| 2006/0073805 | A1 | 4/2006 | Zumkeller et al. |
| 2006/0097573 | A1 | 5/2006 | Gidge et al. |
| 2006/0132299 | A1 | 6/2006 | Mansfield et al. |
| 2006/0140260 | A1 | 6/2006 | Wasaki et al. |
| 2006/0165054 | A1 * | 7/2006 | Iwamura ..................... 370/351 |
| 2006/0187023 | A1 | 8/2006 | Iwamura |
| 2006/0221995 | A1 | 10/2006 | Berkman |
| 2006/0222086 | A1 | 10/2006 | Frye, Jr. |
| 2006/0251179 | A1 | 11/2006 | Ghoshal |
| 2006/0291546 | A1 | 12/2006 | Zitting |
| 2006/0291575 | A1 | 12/2006 | Berkman et al. |
| 2007/0001821 | A1 | 1/2007 | Berkman |
| 2007/0002876 | A1 | 1/2007 | Berkman et al. |
| 2007/0025244 | A1 | 2/2007 | Ayyagari et al. |
| 2007/0036171 | A1 | 2/2007 | Magin |
| 2007/0039035 | A1 | 2/2007 | Magin |
| 2007/0136766 | A1 | 6/2007 | Iwamura |
| 2007/0183447 | A1 | 8/2007 | Binder |
| 2009/0040030 | A1 | 2/2009 | Mathews et al. |

FOREIGN PATENT DOCUMENTS

| | | |
|---|---|---|
| GB | 2 293 950 A | 4/1996 |
| JP | 10200544 A2 | 7/1998 |
| WO | WO-03/030396 A2 | 4/2003 |
| WO | WO 2004102868 | 11/2004 |

OTHER PUBLICATIONS

"Outlook Conference 2004: Amperion Deployment Overview", *Primen Conference*, (May 7, 2004),1-10.

"Centralized Commercial Building Applications with the Lonworks® PLT-21 Power Line Transceiver", *Lonworks Engineering Bulletin, Echelon*, (Apr. 1997),1-22.

"Demand Side Management with LONWORKS® Power Line Transceivers", *LONWORKS Engineering Bulletin*, (Dec. 1996),1-36.

Horiguchi, Akira "High Speed Power Line Communication Technology", *Mitsubishi Electric Advance* vol. 109, (Mar. 2005),1-27.

Hawkins, Bob "Sault Ste. Marie, Canada's First Working BPL Installation", La Revuw des Radioamateurs Canadiens,(Jul. & Aug. 2004),1-4.

* cited by examiner

METHOD FOR ESTABLISHING POWER LINE COMMUNICATION LINK

FIELD OF THE INVENTION

The present invention generally relates to data communications over a power distribution system and more particularly, to a method of establishing a power line communication link in a multi-unit building.

BACKGROUND OF THE INVENTION

Well-established power distribution systems exist throughout most of the United States, and other countries, which provide power to customers via power lines. With some modification, the infrastructure of the existing power distribution systems can be used to provide data communication in addition to power delivery, thereby forming a power line communication system, which may be a broadband communication system. In other words, existing power lines that already have been run to and through many homes and offices, can be used to carry data signals to and from the homes, buildings, and offices. These data signals are communicated on and off the power lines at various points in the power line communication system, such as, for example, near homes, offices, Internet service providers, and the like.

At the user premises of a subscriber accessing a power line communication system, low voltage power lines are used to carry data communications. Because these same lines may supply power to appliances, equipment and other devices, there may be noise on the power line that attenuates the data signal. In a multi-unit building there are many power lines and devices which potentially may decrease data signal performance. Accordingly, there is a desire to assure an effective power line communication link for a device accessing the power line communication system in a 'noisy' environment.

For multi-unit building such as apartment buildings, office buildings, hospitals, mixed use buildings, etc., LV power lines extend to circuit breaker panel(s) or power meters, then may be routed to wall sockets in the various building units. Depending on the design of the building, the LV power lines for one unit (e.g., apartment, room, or office) will often be physically near the LV power lines of one or more other units. When two LV power lines are sufficiently close, the data signal carried on one LV power line may be inadvertently coupled onto the other LV power line. The coupling may occur due to the inherent property of a current-carrying wire producing an electromagnetic (EM) field. The EM field produced by one wire may in turn generate a current in the other wire. As a result, the data signal of one wire may be coupled onto another wire. This electromagnetic coupling occurs when the wires are not sufficiently isolated or sufficiently shielded. Thus, the coupling may occur even though the conductor of the first wire is not physically connected to the conductor of the other wire. One or more embodiments of this invention takes advantage of the coupling described above.

Embodiments of the present invention address some of these needs and offer some advantages over the prior art.

SUMMARY OF THE INVENTION

The present invention provides a power line communications method for a multi-unit building. One embodiment includes determining the quality of a communication link associated with each of a plurality of communication nodes, selecting one of the plurality of communication nodes based, at least in part, on the quality of the communication links associated with the communication nodes; and establishing communications with an external network through the selected one communication node. In addition, in some embodiments at least one of the communication links associated with the plurality of communication nodes includes a non-conductive radio frequency coupled segment.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, enterprise applications, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

System Architecture and General Design Concepts

Figure 1:
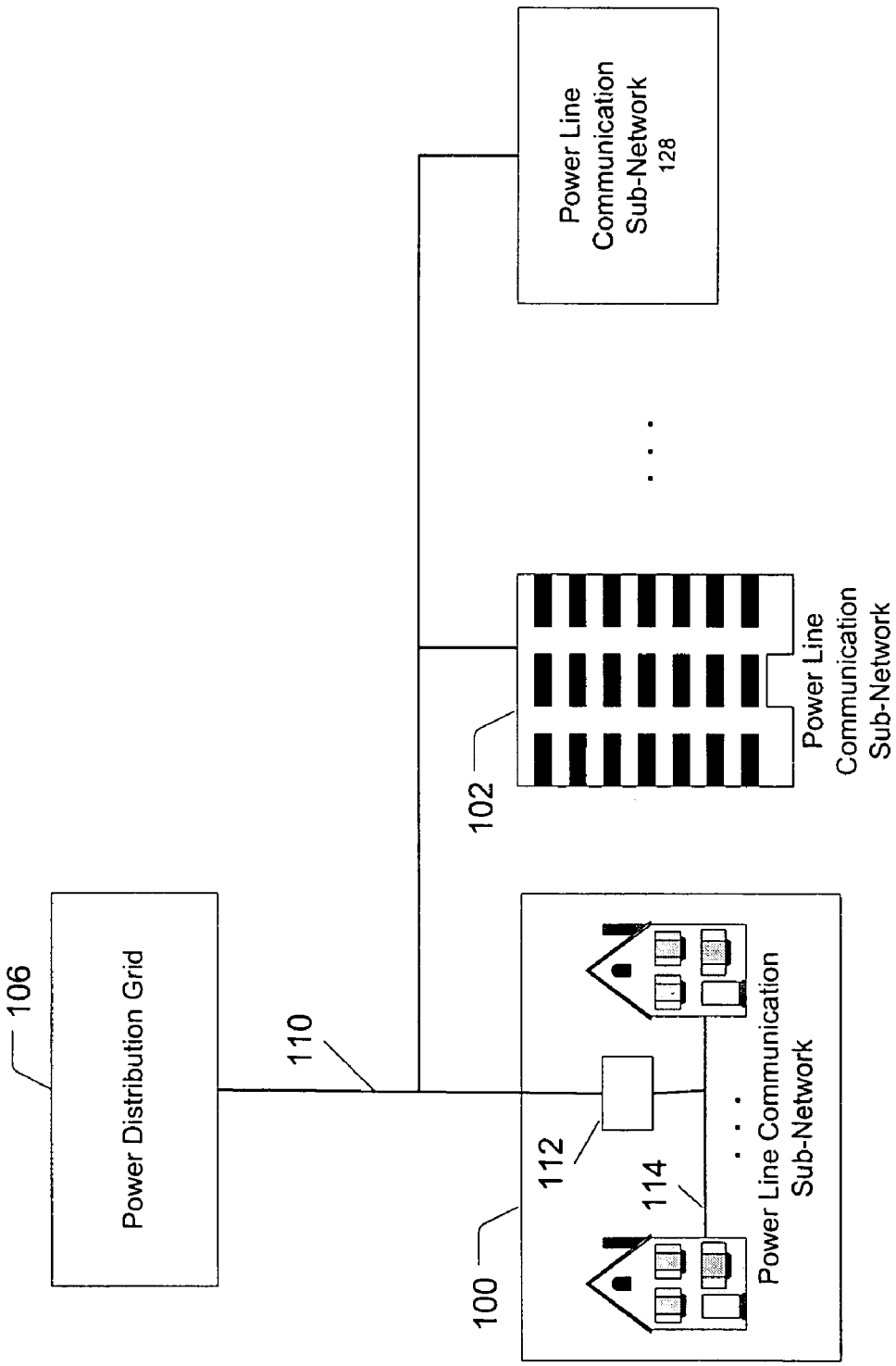
FIG. 1 is a block diagram of several example power line communication sub-networks operating over a power distribution system.

FIG. 1 shows several power line communication sub-networks (PLCS) coupled into a power distribution grid 106. Any of several PLCS 100, 102, 128 embodiments or the like may be implemented. A given PLCS includes communication nodes and links for establishing a communication network.

The power distribution grid 106, also referred to herein a power distribution system, includes components for power generation, power transmission, and power delivery. Power is generated at a power generation source, which typically generates power as high as 25 kilo-volts (kV). A transmission substation, typically located near a corresponding power generation source, increases the generated voltage to a desired high voltage for transmission along high voltage (HV) transmission lines. Typical voltages found on HV transmission lines range from 69 kV to in excess of 800 kV.

Switching substations are located along the grid to route the high voltage power line transmissions from one portion of the power grid to another portion. Distribution substations receive the high voltage power line transmissions and reduce the high level power voltages to medium level power voltages. Medium voltage (MV) power lines 110 distribute the medium level power voltages to a region or local area. Typical voltage levels on the MV power lines 110 range from about 1000 V to about 100 kV.

To distribute power at low level voltages that are required at customer premises, the MV power lines 110 extend to multiple distribution transformers 112. A distribution transformer 112 steps down the medium level power voltages to the requisite lower level voltages. Low voltage (LV) power lines 114 carry low level power voltages to households and other types of customer premises. Typical voltage levels on LV power lines 114 range from about 100 V to about 240 V.

Transformers are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Transformers, therefore, provide voltage conversion for the power distribution system. Thus, power is carried from a substation transformer to a distribution transformer over one or more MV power lines. Power is carried from the distribution transformer to the customer premises via one or more LV power lines.

A distribution transformer 112 may function to distribute one, two, three, or more phase power signals to a structure, depending upon the demands of the user. In the United States, for example, these local distribution transformers 116 typically feed anywhere from one to ten homes, depending upon the concentration of the customer premises in a particular area. Distribution transformers may be pole-top transformers located on a utility pole, pad-mounted transformers located on the ground, or transformers located under ground level.

Host Power Line Communication Sub-Network

Figure 2:
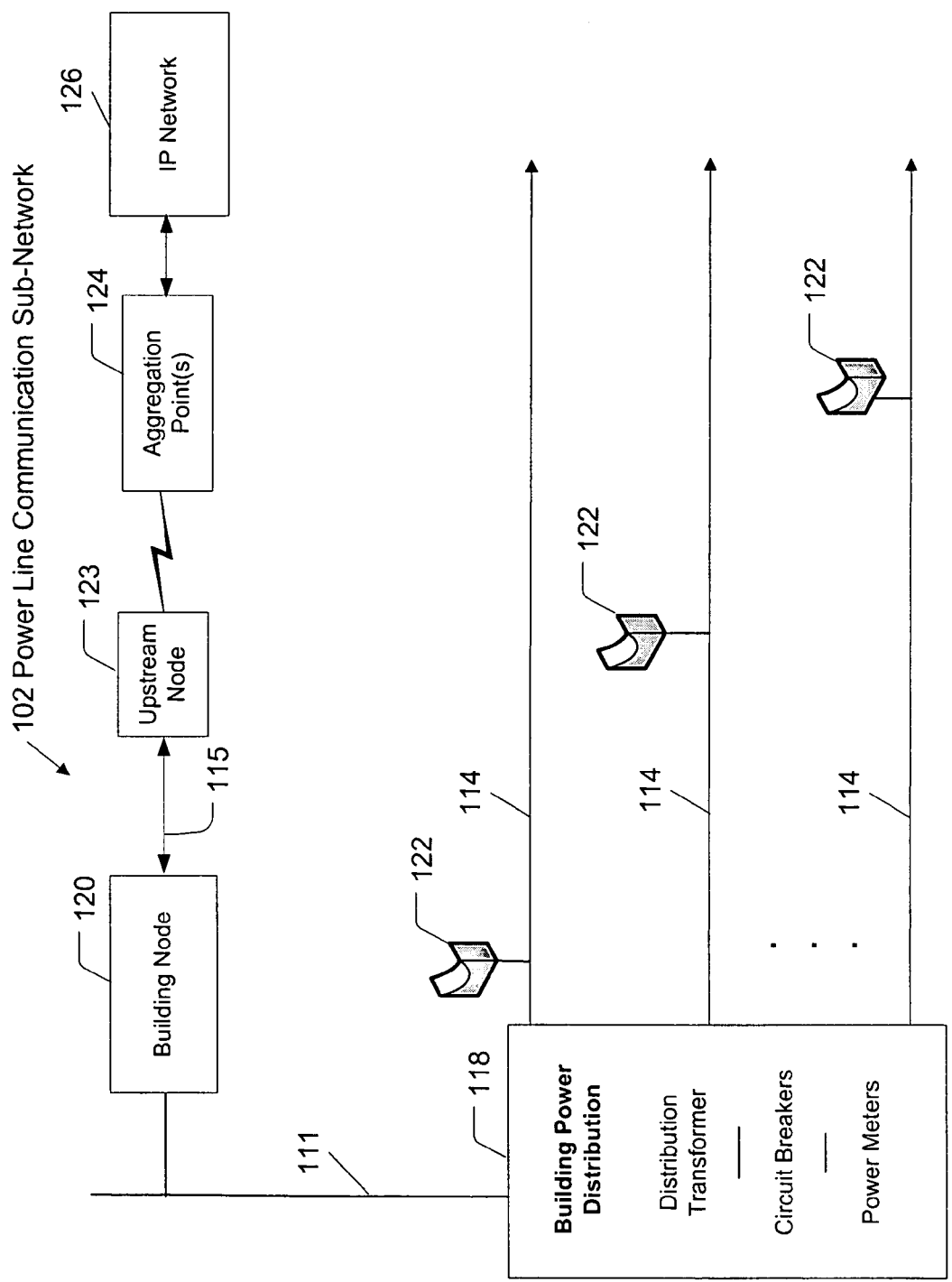
FIG. 2 is a block diagram of an example power line communication sub-network for a multi-unit building.
Figure 3:
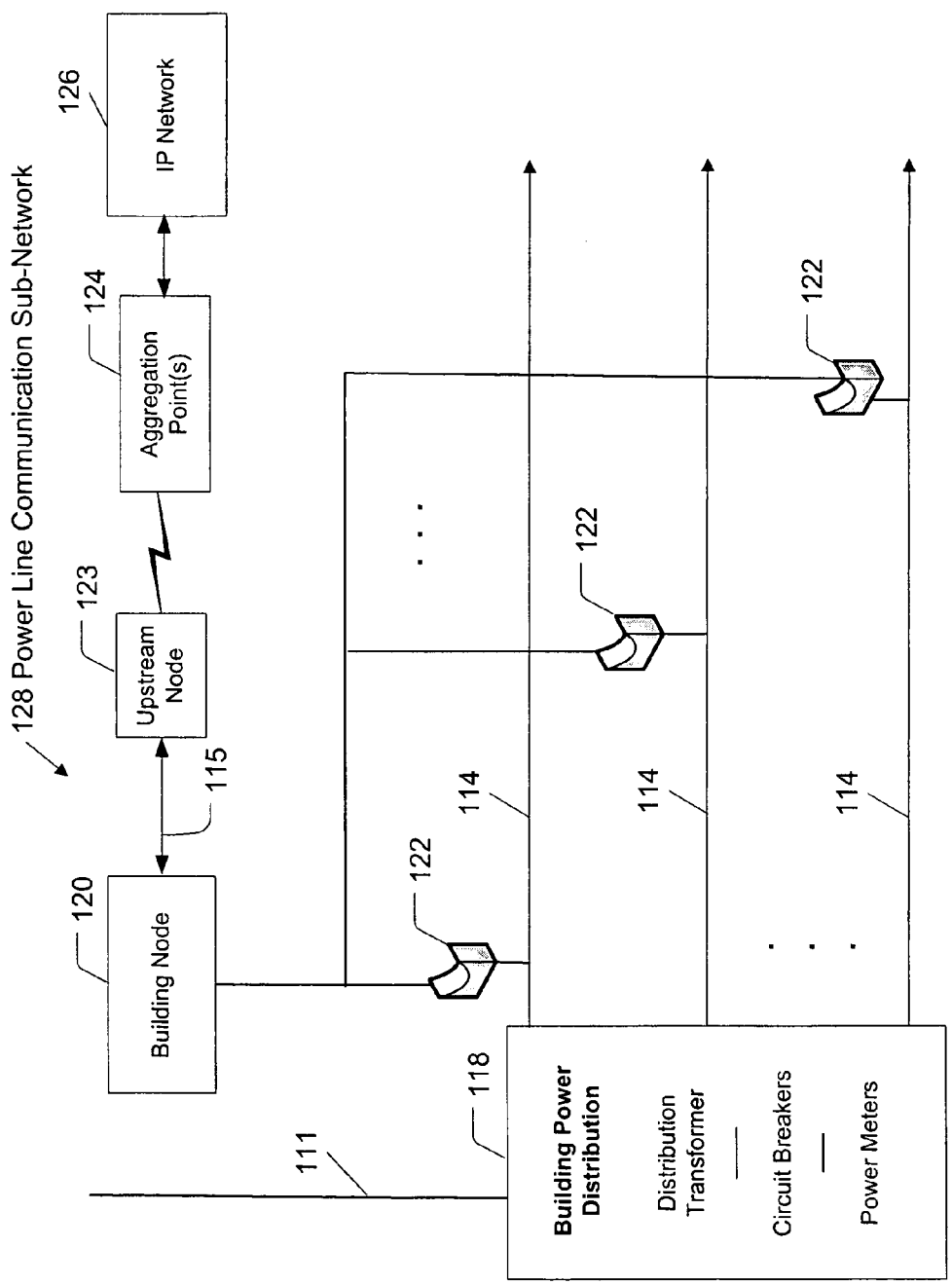
FIG. 3 is a block diagram of another example power line communication sub-network for a multi-unit building.

FIG. 2 shows an embodiment of a power line communication sub-network (PLCS) 102 and a power distribution layout for a multi-unit building. FIG. 3 shows another embodiment of a power line communication sub-network (PLCS) 128 and a power distribution layout for a multi-unit building. Like parts are given the same part numbers. The following description applies to both PLCS 102,128 embodiments.

Power lines 111 extend to the building power distribution sub-system 118. In one embodiment the power lines 111 are LV power lines, which extend from a distribution transformer (not shown) to the building power distribution sub-system 118. In another embodiment (not shown) the power lines are MV power lines 110, which extend to the building power distribution sub-system 118. The power distribution sub-system includes LV power lines 114, circuit panels and power meters. For the embodiment in which power lines 111 are MV power lines, the power distribution sub-system 118 also includes a distribution transformer which converts the medium voltage power signals to low voltage power signals for distribution to local units within the building.

The power line communication sub-network 102 includes multiple communication nodes, including a building node 120, multiple local communication nodes 122, and an upstream node 123. The building node(s) 120 may be situated at or near the multi-unit building, such as inside the building, on the building exterior, at a pole servicing the building, near a pad mounted transformer servicing the building, or elsewhere in the vicinity of the multi-unit building. The local communication nodes 122 may be situated at the multi-unit building, such as inside the building or on the building exterior. The local communication nodes 122, however, alternatively may be located near the multi-unit building, such as at a nearby power service area (e.g., underground; in a separate power room). The upstream node 123 may be situated away from the multi-unit building such as, for example, along the MV power lines 110. Although in some embodiments the upstream node 123 may be located at the building.

Each communication node may be formed by a communication device, such as a backhaul point, a repeater or a bridge. In some embodiments the bridge is formed by a bypass device. The bridge also is referred to as a power line bridge herein. In one embodiment, one or more building nodes 120 may be formed by power line bridges, while the local communication nodes may be formed by repeaters and the upstream node may be formed by a backhaul point. In another embodiment, the building node(s) 120 may be formed by power line bridges and the local communication nodes 122 formed by bridges and/or repeaters, while the upstream node may be formed by a backhaul point. In still another embodiment, the building node 120 may be formed by a backhaul point and the local communication nodes 122 formed by bridges or repeaters.

One or more backhaul points may be included in the sub-network 102/128 to serve as interfaces and gateways for communications into and out of the sub-network 102. Backhaul points function as building nodes 120 in some embodiments and/or as upstream node(s) 123 in other embodiments. The building node 120 is coupled to the upstream node 123 by a communication link 115. In one implementation the communication link is an MV power line 110. In such embodiment the building node 120 is connected to the upstream node 123 by the MV power line 110 (i.e., one or more MV power line conductors). In another implementation, the communication link 115 may comprises a coaxial cable. In such embodiment the coaxial cable may connect the building node(s) 120 and the upstream node 123. In yet another implementation, the communication link 115 may be a wireless link so that the wireless connection is established between the building node(s) 120 and upstream node 123. The upstream node(s) 123 may be communicatively coupled to an aggregation point (AP) 124. In some embodiments, the building node(s) 120 may be communicatively couple to the AP 12 directly (i.e., there may not be an upstream node 123). The AP 124 typically includes an Internet Protocol (IP) network data packet router and is connected to an IP network backbone, thereby providing access to an IP network 126 (and be a point of presence—'POP'). Alternatively, the AP 124 may be connected to a POP, which provides access to the IP network 126, or another communication network. Any available mechanism may be used to link to the AP 124, (e.g., fiber optic conductors, T-carrier, Synchronous Optical Network (SONET), and wireless techniques).

Referring to FIG. 2, the PLCS 102 includes one or more local communication nodes 122 coupled to the building node 120 via the MV power lines and/or the LV power lines 114. Referring to FIG. 3, the PLCS 128 includes one or more local communication nodes 122 coupled to the building node 120 via a coaxial cable, a T-1 line, a fiber optic cable, wirelessly (e.g., 802.11 or satellite such as WildBlue®), or via another communications medium. The PLCS 102/128 may employ bridges and/or repeaters as the local communication nodes 122. For example, power line repeaters (indoor, outdoor, low voltage (LVR) and/or medium voltage) may be remotely configured and enabled/disabled to extend the communications range of other communication elements (e.g., bridges, backhaul points, and other nodes). The local communication nodes 122 may provide communication services for user devices (not shown). Exemplary communication services, include: security management; IP network protocol (IP) packet routing; data filtering; access control; service level monitoring; service level management; signal processing; and modulation/demodulation of signals transmitted over the power lines.

The PLCS 102, 128 (and the network elements thereof) may be monitored and controlled via a power line server that may be remote from the structure and physical location of the network elements. Examples of bridges (e.g., bypass devices), backhaul points, repeaters, power line servers, and other components are described provided in U.S. Appl. No. 60/633,737, entitled "Power Line Repeater and Method," filed Dec. 6, 2004, which is hereby incorporated by reference in its entirety.

Figure 4:
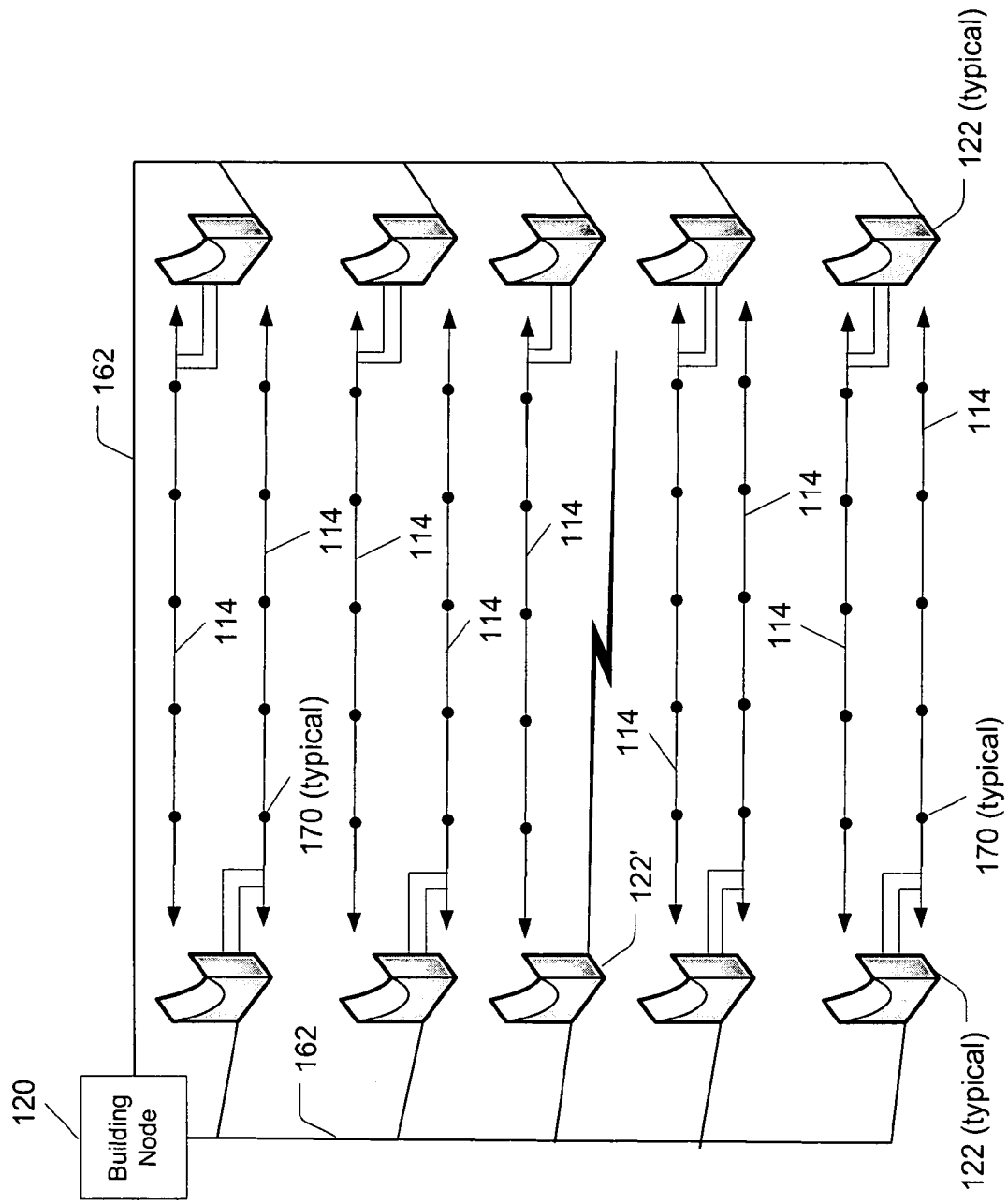
FIG. 4 is a diagram of a portion of the power line communication sub-network.

FIG. 4 shows a partial layout of communication nodes for a multi-unit building such as PLCS 100, 102 or 128, In one embodiment, there is a local communication node 122 (e.g., bridge; repeater) on each floor. In other embodiments there are more than one local communication node 122 for each floor. In various embodiments, there may be one local communication node 122 for each unit, one local communication node 122 for the units on each side of the floor, one local communication node 122 for the units on each quarter of the floor, or one local communication node 122 for some other portion of a given floor in the building. Still other embodiments may include one local communication node 122 for every two, three, four or other increment of floors. Each local communication node 122 may service its respective user devices by providing broadband (BB) communications via the low voltage power lines 114 of the associated floor or floors (or portion thereof). To do so, each local communication node 122 may be electrically and communicatively connected to power outlets via multiple power lines. In one embodiment, the local communication nodes 122 connect to the LV power lines 114 at the circuit breaker box or at the power meter of the building power distribution system 118.

Each local communication node 122 also may be communicatively connected to the building node 120 (e.g., bridge; backhaul point) via a communication medium 162. The communication medium may be a MV power line, a LV power line, a coaxial cable, a T-1 line, a fiber optic cable, wireless medium (e.g., 802.11 or satellite such as WildBlue®)), or another communications medium. In an embodiment in which the communication medium 162 is a coaxial cable, the local communication nodes 122 may be connected to the coaxial cable via a T connection (and be in parallel with the medium) or in series. FIG. 4 also shows LV power lines 114 within the building extending to multiple power outlets 170. Note that in some embodiments, such as shown in FIG. 4, a portion of the building (e.g., a lobby or other area) could be serviced via a local communication node 122' (e.g., bridge; repeater) that has a wireless transceiver (e.g., a Wifi transceiver), instead of a LV power line transceiver.

Figure 5:
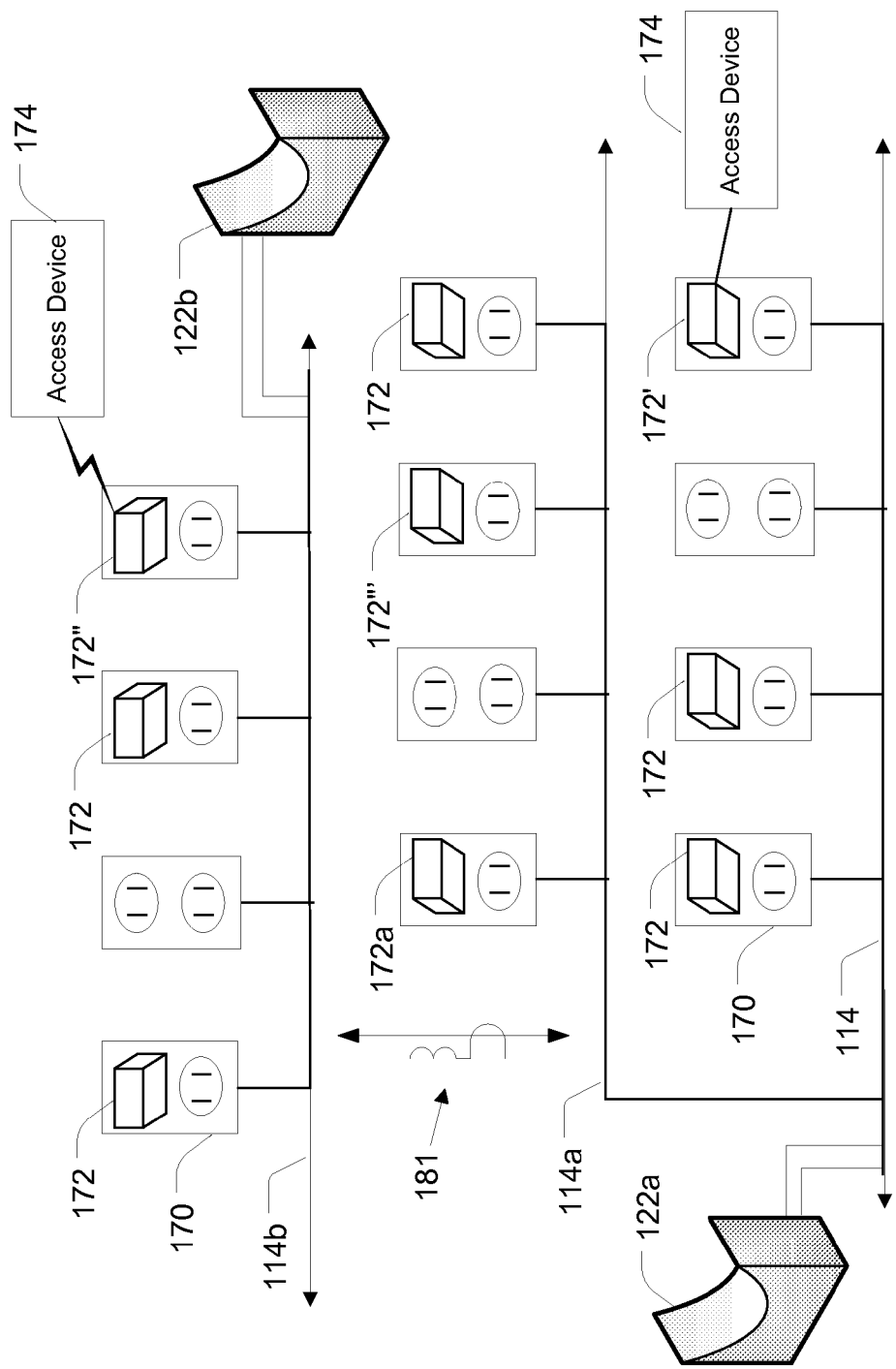
FIG. 5 is another diagram of a portion of an example power line communication sub-network, including power line communication devices.

FIG. 5 shows a portion of a PLCS with communication devices (e.g., bridge; repeater) serving as local communication nodes 122, and communication devices (e.g., power line communication devices 172) serving as interfaces to user devices 174. The LV power lines 114 extend throughout the building to provide power. A customer accesses power for their appliances and devices by plugging into a power outlet 170. In a similar manner, the customer may plug the power line communication device 172 into a power outlet 170. The power line communication device 172 allows the LV power lines 114 to be used to carry data signals. A method for establishing a communication link used by a specific power line communication device 172 within the PLCS 102,128 is described below.

Figure 6:
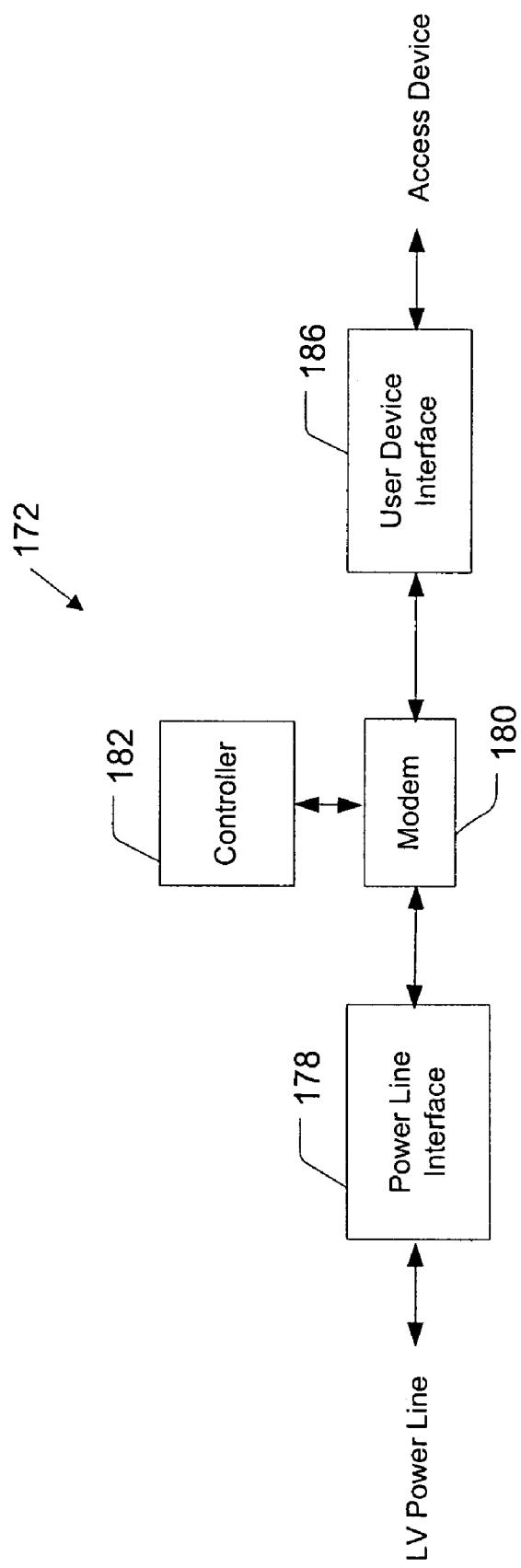
FIG. 6 is a block diagram of an example embodiment of the power line communication device.

FIG. 6 shows a power line communication device 172, including a power line interface 178, a modem 180, a controller 182, and a user device interface 186. The power line communication devices 172 allow a customer to connect user devices 174 to the PLCS so that data signals are carried by the power wiring. Data downloaded to a user device 174 may be routed along the PLCS 102 to a building node 120, then routed to a local communication node 122, which may route the data to a power line communication device 172. The power line interface 178 may filter, amplify, and isolate the data signals from an LV power line 114 and then supply the data signals to the modem 180 for demodulation. The data may then be routed through the user interface 186 to the user device 174. Data transmitted to the PLCS 102 from a user device 174 is supplied to the user device interface 186 (e.g., via an Ethernet cable). The data may be formatted and modulated by the modem 180 and transmitted over the LV power line by the power line interface 178. Various data formats and modulation schemes may be used. For example, the HomePlug® Alliance has developed a standard (HomePlug 1.0 and is developing AV) for communicating over low voltage power lines. The data signal output from the power line communication device 172 traverses along the LV power lines 114 to a local communication node 122. The local communication node 122 may route the data signal to the building node 120, which in turn may route the data to an upstream node 123 and/or AP point 124 for communication to an IP network 126.

The user device may be any device capable of communicating digital data or other data including, for example, a computer, local area network (LAN), router, Voice-over IP device, game system, digital cable box, power meter, utility meter, security system, alarm system (e.g., fire, smoke, carbon dioxide, etc.), stereo system, television, digital video recorder, or fax machine. One or more user devices 174 may link to a given power line communication device 172 via a wired or wireless connection. The power line communication device 172 can have a variety of interfaces 186 to serve customer data appliances, such as an Ethernet connector, a wireless interface, an RJ-11 Plain Old Telephone Service (POTS) connector, an RS-232 connector, a USB connector, a 10 Base-T connector, an RJ-45 connector, and the like. In this manner, a customer can connect a variety of user access devices 174 to the power line communication device 172. For example, power line communication device 172' provides an Ethernet connection to link to user device(s). Power line communication device 172" provides a wireless connection to link to user device(s). Power line communication device 172''' provides both a wired and wireless connection to link to user devices. Thus, the device 172 may include a router (herein meant to include a bridge, switch, other such functional component), which may be implemented in the controller 182 via executable program code stored therein. Additionally, the controller 182 (or router function therein) may assign a priority value to data from user devices. For example, data from a VoIP telephone device may be assigned a higher priority than general data (e.g., email data or web page) to provide for acceptable quality of service.

Method of Establishing a Communication Link

For multi-unit building such as apartment buildings, office buildings, hospitals, mixed use buildings, etc., LV power lines extend to circuit breaker panel(s) or power meters, then may be routed to wall sockets in the various building units. Depending on the design of the building, the LV power lines for one unit (e.g., apartment, room, or office) will often be physically near the LV power lines of one or more other units. When two LV power lines are sufficiently close, the data signal carried on one LV power line may be inadvertently coupled onto the other LV power line. The coupling may occur due to the inherent property of a current-carrying wire producing an electromagnetic (EM) field. The EM field produced by one wire may in turn generate a current in the other wire. As a result, the data signal of one wire may be coupled onto another wire. This electromagnetic coupling occurs when the wires are not sufficiently isolated or sufficiently shielded. Thus, the coupling may occur even though the conductor of the first wire is not physically connected to the conductor of the other wire. The coupling occurs between two proximally located, non-contacting conductors across a non-wire medium (e.g., air; wire insulation). Such proximal location may be within any range which allows electromagnetic coupling to occur, (e.g., inches; feet; yards; centimeters; meters) and will depend on the strength of the signal, the amount of power line shielding, the 'noise' in the environment, and the separation distance between the conductors). Such coupling is referred to herein RF coupling.

Some embodiments of this invention may take advantage of the coupling described above. In a multi-unit building there are many LV wire paths and many end users having various appliances and other electrical devices. Some users may use electrically 'noisy' devices which have the effect of attenuating and masking portions of a data signal being carried along the same wires powering these devices. The quality of a PLCS communication link in the building over the LV power line network will be a factor of many different things including the physical architecture of the wiring (how long, how many branches, extension cords, etc.), the proximity of LV wiring to noise-radiating sources, and the 'noisiness' of appliances connected to the lines. Adverse effects may impact an entire LV path within the multi-unit building, including wiring remote from a unit(s) at which a 'noise' source is located. The cumulative effect of 'noise' occurring within the LV wiring of the building may result in some LV-wired data paths performing less well than other LV wired paths. The method of this invention may allow an alternative data path to be selected due to the ability to radio frequency couple the data signal onto an alternative LV wire.

Due to RF coupling, a power line communication device 172 (and its associated user devices) may be able to communicate with more than one upstream communication node 122. In other words, some power line communication devices 172 may be able to communicate with one or more communication nodes 122 that are conductively connected to the same LV power line conductor and also, due to RF coupling, to one or more communication nodes that are not conductively connected to the same LV power line conductor. Thus, some links may include a radio frequency coupled segment and two power line conductor segments. The number, location, and quality of the communications link with the communication nodes with which a power line communication device can communicate is often not predictable. Thus, some embodiments of the present invention provide a method for selecting one of a plurality of communication nodes with which a power line communications device is to communicate.

Figure 7:
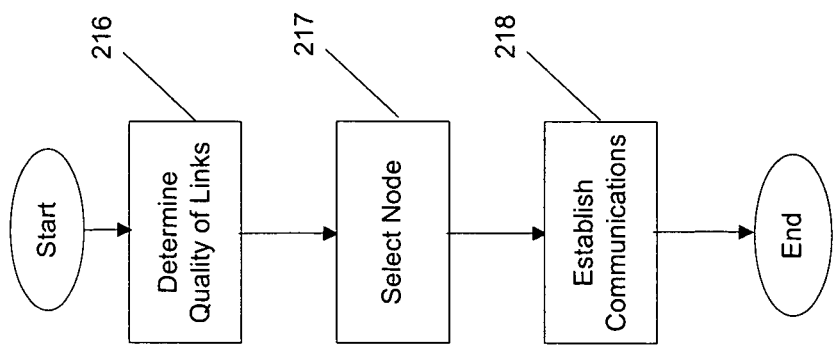
FIG. 7 is a flow chart of an example process for selecting a communication link for a power line communication device.

FIG. 7 is a flow chart of one example embodiment of a method for a power line communication device 172 to establish a communication link. This embodiment includes the step 216 of determining the quality of a communication link associated with each of a plurality of communication nodes. The quality of the link may be related to or based on bit error rate information. At step 217 the method includes selecting one of the plurality of communication nodes based, at least in part, on the quality of the communication links associated with the communication nodes. At step 218, the method includes establishing communications with an external network, such as the internet, through the selected communication node. In addition, at least one of the communication links associated with the plurality of communication nodes may includes a non-conductive radio frequency coupled segment. This process may be repeated periodically or intermittently to determine which node 122 may provide better communications to the device 172 at any given time.

Figure 8:
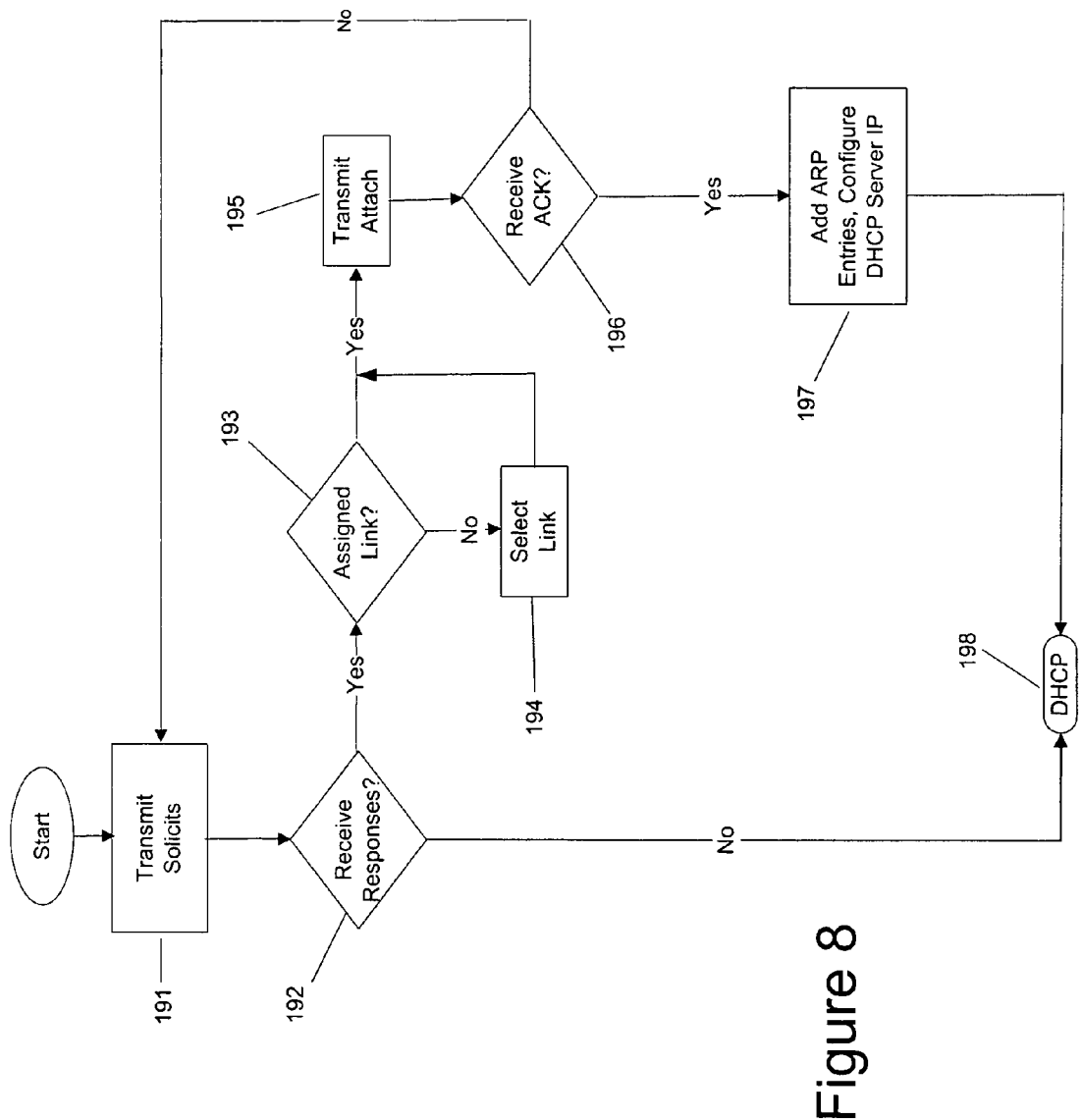
FIG. 8 is a flow chart of an example process for selecting a communication link for a power line communication device.

FIG. 8 is a flow chart of an example embodiment of a method for a power line communication device 172 to establish a communication link in the PLCS. Upon initial installation and power up of a power line communication device 172, a Link Negotiation Protocol (LNP) may be performed to discover possible communication nodes that may provide a communication link. The possible communication nodes 122 include the communication nodes 122 physically wired to the power line communication device 172 and any communication nodes 122 having LV power lines 114 which RF couple the data signal to and from the device's 172 LV power line 114. For example, as shown in FIG. 5 the power line communication device 172a is physically wired to local communication node 122a along LV power lines 114a. However, in this example RF coupling 181 between LV wires 114a and 114b also causes the data signals to/from power line communication device 172a to couple to from power line wire 114b and from/to communication node 122b. Accordingly, the power line communication device 172a may establish a communication link with both communication nodes 122a and 122b. In one embodiment only an uplink path is negotiated. In such case, the uplink path of power line communication device 172a may be to one of either local communication node 122a or 122b, while the downlink path is limited to the local communication node 122a physically wired to the power lone communication device 172a. In another embodiment the link negotiation result may provide a link used for both an uplink path and a downlink path (i.e., one bi-directional communication link).

In this embodiment, the LNP is a layer two protocol, but other embodiments may additionally, or instead, use other layers (e.g., layer three). For a previously unactivated and unconfigured power line communication device 172a, the LNP sets a pathway for initiating dynamic host configuration protocol (DHCP) negotiation with a local communication node 122 and to eventually get its Activation from the power line server (PLS). This pathway includes a local communication node (e.g., local communication node 122a; local communication node 122b) to which the power line communication device 172 "attaches", meaning that the power line communication device 172 typically will use such local communication node for future uplink communications, unless it is specifically instructed otherwise or reboots and acquires a different link address via further LNP execution.

The LNP provides link information that may include information of the address of the local communication node device (e.g., bridge, repeater, backhaul point) to be used by the power line communication device for communicating with its DHCP server, which in this embodiment may be the address of its local communication node 122, building node 120 or the address of another local communication node. In addition, the LNP may provide the information of the address of the DHCP server itself, which typically will be the address of the building node 120 in this embodiment. Thus, LNP may provide a method to discover the IP address (layer 3) of the local communication node 122 along with a MAC address (layer 2) of the building node 120 or another node.

The LNP may include four types of messages: Solicit, Advertise, Attach, Acknowledged/Not-Acknowledged (ACK/NACK). Power line communication devices 172 may transmit Solicit and Attach messages. Local communication nodes 122 and building nodes 120 may transmit Advertise and ACK/NACK messages.

Referring to the flowchart of FIG. 8 and the illustration of FIG. 5, at power up, a power line communication device 172 may broadcast a Solicit message (step 191 in FIG. 8), which indicates that the power line communication device 172 is searching for a link for DHCP negotiations and/or for communications. Testing for a response occurs at step 192. Those nodes 120,122 that receive and decrypt the Solicit message may respond by transmitting an Advertise message, which indicates their availability as a link. The Advertise message may include a Link Figure of Merit (LFoM) (which may be based on bytes 40 information) and a link flag. At step 193 the power line communication device 172 may test to see if there is an assigned link. In some instances, the PLS may assign an upstream local communication node (either one of local communication nodes 122a and 122b) as the upstream node for communications for a specific power line communication device 172a. When the link flag is set in the Advertise message, it indicates that the responding node (the device transmitting the Advertise message) has been designated as the link node (e.g., by the PLS) for the power line communication device 172 transmitting the Solicit message. The LFoM information in the Advertise message includes data relating to the quality of the communications link between the devices (i.e., the power line communication device 172 and a given local communication node 122 or building node 120) and may include bit error rate (BER) information or information derived from the BER. The response is received and processed by the power line communication device 172. If the Advertise message indicates the responding device is an assigned link (i.e., the link flag in the message is set), the power line communication device 172 may transmit an Attach message at step 195, subsequently receive an ACK at step 196, and then update its configuration information at step 197, and proceed to DHCP at step 198.

If there are no responses with the link flag set, the initializing power line communication device 172 may transmit multiple Solicit messages before attaching to a responding link (e.g., a local communication node 122 or building node 120). The multiple Solicit messages typically will increase the chances that the power line communication device 172 will discover its most reliable temporary link. In addition, the multiple LNP Solicit messages may allow the power line communication device 172 to collect multiple LFoM samples from each responding potential link. The power line communication device 172 may average the LFoM data from the responding link devices to determine the most reliable link.

A device that has been designated as the assigned link (e.g., by the PLS) will include an assigned link flag in its Advertise message (in response to the Solicit message). If an assigned link responds to the Solicit message, a power line communication device 172 typically will attach to it, regardless of the link device type (e.g., bridge; repeater; backhaul point) and LFoM of other responding links. In the event that two or more links indicate that they are the assigned link, the power line communication device 172 may attach to the first link responding with the assigned link flag set—or, in an alternate embodiment, to the link device with best LFoM data.

In this embodiment, if the power line communication device 172 fails to receive a response from an assigned link it will base attachment on the network element (NE) type (i.e., LV repeater or bridge) and/or LFoM data for each responding link device. Thus, at step 194 a power line communication device 172 may select the link by scoring each link responding to its Solicit message. This score may be related to the quality of the link between the power line communication device 172 and the responding link device and, as an example, may be related to the average LFoM data.

However, in general the link quality data may need to meet or exceed the LFoM threshold value for the device type. The LFoM threshold value may include a minimum LFoM value for bridges and a separate minimum LFoM value for repeaters, both of which may be transmitted from the PLS (and stored in memory) or pre-configured in memory of the power line communication device 172. Thus, the operator may provide an input to the PLS to cause the software of the PLS to transmit the power line communication device 172 LFoM and local communication node 122 LFoM thresholds for one or more power line communication devices for use in LNP link device selection.

Thus, the power line communication device 172 may include a software segment for receiving and processing LFoM threshold information transmitted from the PLS. In addition to threshold information transmitted from the PLS, the power line communication device 172 may store in memory default minimum threshold values for the power line communication device 172, bridge(s),backhaul point, and repeater(s) used in link selections during LNP negotiations. The controller 182 of the power line communication device 172 may include memory and executable program code for implementing the methods of the invention. Alternately, the user device may include memory and executable program code for implementing the methods of the invention in which case some embodiments of the power line communications device may not include a controller.

In this embodiment, the controller 182 of the power line communication device 172 may implement an algorithm for weighted selection of its link during LNP negotiations. First, Advertise messages with a LFoM value from a local communication node 122 that meets or exceeds the local communication node LFoM threshold may be selected above a local communication node whose LFoM value does not meet or exceed the local communication node LFoM threshold. Second, in this example algorithm, Advertise messages with a LFoM value from a physically coupled local communication node 122a that meet or exceed the power line communication device LFoM threshold are selected above a non-physically coupled (RF coupled) local communication node 122b, whether or not the LFoM information from that node 122b meets or exceeds the LFoM threshold. The power line server may transmit information to the power line communications device 172, which is stored in memory, to allow the device 172 to determine which nodes 122 are connected to the same LV wiring (i.e., that are physically coupled). Additionally, in embodiments where repeaters are used, Advertise messages with a LFoM value from a local communication node 122

(that is not a repeater) that meets or exceeds the local communication node LFoM threshold may be selected above a local communication node that is a repeater (regardless of whether the value from the repeater meets or exceeds the local communication node LFoM threshold). In general, repeaters may cause latency which may undesirable. In other embodiments, such as those where latency is not important, repeaters may be treated as other communication nodes.

The selection between devices of the same type is given to the device with the higher LFoM value. For example, if the choice is between bridges, the bridge with the higher LFoM value typically will be selected. Similarly, if there were no bridge Advertise messages with LFoM data above the bridge LFoM threshold and the choice is between repeaters, the repeater with the higher LFoM value typically will be selected (provided at least one had a LFoM value above the LFoM threshold).

Once the power line communication device 172 determines its upstream link, it transmits an Attach message to that link device at step 195. In response to receiving the Attach message, the link device typically will respond with an Acknowledge message, which is received by the power line communication device 172 at step 196.

Upon receiving the LNP ACK at step 196, a power line communication device 172 typically will also configure its DHCP client with the link IP Address at step 197. As discussed, the link IP may be a layer 3 address used to route all traffic being sent upstream. The next upstream hop MAC address may be a layer 2 address used to reach that link IP address. Static ARP may be used to set this binding so that the power line communication device 172 knows how to communicate correctly. Consequently, the power line communication device 172 may make the following ARP entries (store in memory) upon receiving an Acknowledge message from its link device:

Link IP→Upstream Link MAC address
DHCP Server IP→Upstream Link MAC address

The DHCP client of the power line communication device 172 generally will use this address as the address for communications with its DHCP server at step 198.

In the event that no links respond to the Solicit message, a power line communication device 172 may then attempt DHCP request at step 198. In this situation, DHCP messages will be broadcast. The power line communication device 172 may reattempt LNP negotiations if the DHCP attempt fails.

Although the method is described above for establishing a link for a power line communication device 172, the method also may be implemented to establish a link for other communication devices, (e.g., bridge, repeater). For example, the method also may be implemented to establish a link between a communication device (e.g., a local communication node 122) and another communication node (e.g., another local communication node 122 or a building node 120). For example, a local communication node 122 may be connected to a building node 120 via other communication nodes 122 that act as repeaters and/or bridges. The present invention may also be used to select one of a plurality of communication nodes (e.g., one repeater and one bridge) for communications when all of the communication nodes are coupled to the same LV power line wiring as the communication device.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method of using a computer communication device to establish a communication link in a power line communication network of a multi-unit building having a plurality of communication nodes coupled to low voltage (LV) power lines, comprising:

using the computer communication device to perform at least the steps of:

determining the quality of a communication link associated with one of the plurality of communication nodes;

wherein the communication link includes a non-conductive radio frequency coupled segment established via the cross-coupling of data signals between two low voltage power lines;

selecting one of the plurality of communication nodes based, at least in part, on said determining the quality of the communication link associated with the one communication node;

establishing communications through the selected one communication node; and wherein the communication link associated with the selected one communication node includes a non-conductive radio frequency coupled segment established via the cross-coupling of data signals between two low voltage power lines.

2. The method of claim 1, further comprising:

using the computer communication device to perform the following steps:

receiving first data from a user device;

assigning a priority to the first data; and transmitting the first data over a low voltage power line to the selected communication node.

3. The method of claim 1, wherein the communication link associated with a second non-selected communication node does not include a non-conductive radio frequency coupled segment.

4. The method of claim 1, wherein the selected one communication node includes a router configured to route data.

5. The method of claim 1, further comprising:

using the computer communication device to perform the following steps:

receiving first data from one of the plurality of LV power lines;

routing the first data; and providing the first data to one of a plurality of user devices.

6. The method of claim 1, further comprising:

using the selected communication node to perform the following steps:

receiving first data originating from a user device;

assigning a priority to the first data; and transmitting the first data over one of the plurality of low voltage power lines.

7. The method of claim 1, further comprising receiving first data wirelessly from a user device and transmitting the first data via one of the plurality of low voltage power lines to the selected one communication node.

8. The method of claim 1, wherein said determining the quality of the communication link considers information based on the bit error rate of the communication link.

9. A method of using a power line communication device to establish a communication link in a power line communication network having a plurality of communication nodes coupled to low voltage power lines, comprising:

using the power line communication device to perform at least the steps of:

transmitting a first message along a power line to the plurality of communication nodes;

wherein the first message is transmitted to at least one of the plurality of communication nodes via a communication path that includes a non-conductive radio frequency coupled segment established via the cross-coupling of data signals between two low voltage power lines;

receiving responses to the first message from multiple communication nodes including the at least one communication node;

evaluating responses to the first message;

selecting one node of the multiple nodes based on said evaluating;

establishing the communication link with the selected one node; and wherein the communication link established with the selected node includes a non-conductive radio frequency coupled segment established via the cross-coupling of data signals between two low voltage power lines.

10. The method of claim 9, further comprising using the communication device to perform the following steps:

receiving first data from one of the plurality of LV power lines;

routing the first data; and providing the first data to one of a plurality of user devices.

11. The method of claim 9, further comprising receiving first data wirelessly from a user device and transmitting the first data over a low voltage power line.

12. The method of claim 9, wherein said evaluating comprises evaluating the quality of a communication link with each of the multiple nodes.

13. The method of claim 9, wherein said evaluating comprises evaluating said responses to identify a node that is designated as an uplink node for the device.

14. The method of claim 9, wherein the selected one node includes a router configured to route data.

15. The method of claim 9, further comprising:

evaluating communication links with multiple communication nodes;

selecting a second node based on said evaluating communication links; and establishing a communication link with the selected second node.

* * * * *